US008037096B2

(12) United States Patent
Champion et al.

(10) Patent No.: US 8,037,096 B2
(45) Date of Patent: Oct. 11, 2011

(54) MEMORY EFFICIENT DATA PROCESSING

(75) Inventors: Michael Craig Champion, Woodinville, WA (US); Anders Hejlsberg, Seattle, WA (US); Andrew Eyring Kimball, Sammamish, WA (US); Ralf Lammel, Redmond, WA (US); Henricus Johannes Maria Meijer, Mercer Island, WA (US); Ion Vasilian, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 11/771,163

(22) Filed: Jun. 29, 2007

(65) Prior Publication Data

US 2009/0006450 A1 Jan. 1, 2009

(51) Int. Cl.
*G06F 7/00* (2006.01)
*G06F 17/30* (2006.01)

(52) U.S. Cl. ........ 707/792; 707/793; 707/804; 707/805; 707/828; 707/829

(58) Field of Classification Search .................. 707/101, 707/102, 792, 793, 805, 828, 829
See application file for complete search history.

(56) References Cited

U.S. PATENT DOCUMENTS

| 5,878,408 | A | 3/1999 | Van Huben | |
|---|---|---|---|---|
| 6,507,856 | B1 | 1/2003 | Chen et al. | |
| 6,567,814 | B1 * | 5/2003 | Bankier et al. | 707/101 |
| 6,671,853 | B1 | 12/2003 | Burkett et al. | |
| 6,732,153 | B1 | 5/2004 | Jakobson | |
| 6,820,135 | B1 | 11/2004 | Dingman | |
| 6,832,219 | B2 | 12/2004 | Lal | |
| 6,862,588 | B2 | 3/2005 | Beged-Dov | |
| 6,880,125 | B2 | 4/2005 | Fry | |
| 6,886,166 | B2 | 4/2005 | Harrison | |
| 6,898,604 | B1 | 5/2005 | Ballinger et al. | |
| 6,925,631 | B2 | 8/2005 | Golden | |
| 7,073,123 | B2 | 7/2006 | Friedmann | |
| 7,076,766 | B2 | 7/2006 | Wirts et al. | |
| 7,120,645 | B2 | 10/2006 | Manikutty | |
| 7,120,864 | B2 | 10/2006 | Cai et al. | |
| 7,124,137 | B2 | 10/2006 | Lin et al. | |
| 7,177,874 | B2 | 2/2007 | Jardin | |
| 7,181,440 | B2 | 2/2007 | Cras | |
| 7,206,805 | B1 * | 4/2007 | McLaughlin, Jr. | 709/203 |
| 7,254,590 | B2 | 8/2007 | Mudunuri | |
| 7,313,575 | B2 | 12/2007 | Carr | |
| 2002/0038320 | A1 | 3/2002 | Brook | |
| 2003/0217026 | A1 * | 11/2003 | Teig et al. | 707/1 |
| 2003/0220906 | A1 * | 11/2003 | Chickering | 707/2 |
| 2005/0097455 | A1 | 5/2005 | Zhou | |

(Continued)

OTHER PUBLICATIONS

Binary XML Codec (Nux 1.6—API SPecification). "Class BinaryXMLCodec," http://dsd.lbl.gov/nux/api/nux/xom/binary/BinaryXMLCodec.html, last accessed Mar. 1, 2007, 8 pages.

(Continued)

*Primary Examiner* — Rehana Perveen
*Assistant Examiner* — Mark Hershley
(74) *Attorney, Agent, or Firm* — Workman Nydegger

(57) ABSTRACT

Memory efficient data processing is provided in a computer environment. A data representation or description is utilized to reduce memory footprint. A data structure can be serialized iteratively utilizing the representation rather than first loading the entire data structure to memory. Portions of the data structure can be materialized to and removed from memory as function of operational need.

20 Claims, 10 Drawing Sheets

U.S. PATENT DOCUMENTS

| | | |
|---|---|---|
| 2005/0120044 A1* | 6/2005 | Angele et al. ............ 707/102 |
| 2005/0138542 A1 | 6/2005 | Roe |
| 2005/0198057 A1* | 9/2005 | Antoch ............ 707/102 |
| 2006/0020951 A1 | 1/2006 | Fry |
| 2006/0212457 A1* | 9/2006 | Pearce et al. ............ 707/100 |
| 2006/0242563 A1 | 10/2006 | Liu et al. |
| 2007/0005622 A1* | 1/2007 | Fernandes et al. ............ 707/101 |
| 2007/0050760 A1 | 3/2007 | Liu |
| 2009/0006429 A1 | 1/2009 | Champion |
| 2009/0177799 A1* | 7/2009 | Fitzek et al. ............ 709/247 |
| 2010/0042982 A1 | 2/2010 | Aharoni |

OTHER PUBLICATIONS

API Help (Object-Oriented Game Playing Framework). "How This API Document Is Organized," http://www.lhup.edu/mcohen/oogt/docs/help-doc.html, last accessed Mar. 1, 2007, 2 pages.

Nehrer. "An Introduction to Streaming API for XML (StAX)," StAX'ing up XML, http://www-128.ibm.com/developerworks/library/x-stax1.html, Part 1, Nov. 29, 2006, last accessed Mar. 1, 2007 10 pages.

Lammel. "API-Based XML Streaming with Flwor power and functional updates," http://2006.xmlconference.org/proceeedings/91/presentiation.pdf. 2006, 16 pages.

Tarari. "RAX: Random Access XML-Fundamentally Changing How XML is used and Processed," http://xml.coverpages.org/Tarari-RAX-WhitePaper200405.pdf, 2004, 30 pages, San Diego, CA.

U.S. Appl. No. 11/770,696, Mail Date Jul. 2, 2009, Office Action.
U.S. Appl. No. 11/770,696, Mail Date Jan. 7, 2010, Office Action.
U.S. Appl. No. 11/770,696, Mail Date Jul. 21, 2010, Office Action.
U.S. Appl. No. 11/770,696, Mail Date Jan. 3, 2011, Office Action.
U.S. Appl. No. 11/770,696, Mail Date May 18, 2011, Notice of Allowance.

* cited by examiner

```
While:
Cond
        Var:
        Id
                string: n
Body
        AndThen:
        Fst
                Assign:
                Lhs
                        string: factorial
                Rhs
                        Mult:
                        Left
                                Var:
                                Id
                                        string: factorial
                        Right
                                Var:
                                Id
                                        string: n
        Snd
                Assign:
                Lhs
                        string: n
                Rhs
                        Add:
                        Left
                                Var:
                                Id
                                        string: n
                        Right
                                Const:
                                Lit
                                        int: -1
```

Fig. 5

USPTO Patent US 8,037,096 B2

MEMORY EFFICIENT DATA PROCESSING

BACKGROUND

The pervasiveness of computers and other processor-based devices has resulted in data proliferation such that vast amounts of digital data are created and stored daily. Although originally the sole domain of well-funded companies and research institutions, technology advancements and cost reductions over time have enabled computers and other electronic devices to become commonplace in the lives of most everyone. As a result, both businesses and consumers create and interact with large amounts of digital data.

Traditionally, a database management system (DBMS) is employed to manage interaction with database data. The DBMS efficiently manages requests or queries from users and programs so that these entities are free from having to know specifics pertaining to how and where data is physically stored. Furthermore, in handling requests, the DBMS ensures integrity and security with respect to the data. The most common DBMS is a relational database management system (RDBM). In this system, data is stored in a tabular format wherein data resides at the intersection of a row and a column.

With the advent and growing popularity of the Internet and other networking technologies, various other structured data languages or formats have been developed to facilitate storing and sharing of information across different technology systems. One such language is XML (eXtensible Markup Language), which is a standard language that allows entities and/or groups to share information in a convenient fashion. This language uses tags or symbols to markup or describe content. Another format that enables sharing of data is JSON (JavaScript Object Notation). JSON is a lightweight data exchange format rather than a markup language that utilizes a collection of name-value pairs and arrays of values to represent data. XML and JSON can capture various computer data structures (e.g. objects, lists trees) for storage and/or transmission.

A myriad of application programming interfaces (APIs) and/or language implementations can be employed to process structured data. For example, XML data can be formatted, queried and/or transformed by XSLT, XQuery and/or XPath. Furthermore, similar mechanisms can be utilized for serializing or streaming such data. Conventionally, such mechanisms load an entire data structure in memory and subsequently perform operations over the materialized data structure.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to memory efficient data processing. Rather than attempting to materialize an entire data structure in memory prior to performing any operation thereon, materialization can be deferred. A data structure can be materialized at a later time as function of a particular operator to optimize system resources and/or data processing.

In accordance with an aspect of the disclosure, rather than materializing the structure itself, a much smaller representation that describes the structure can be materialized. In one instance, the representation can be executed iteratively to serialize data element by element. Here, the entire structure need not be loaded in memory at the same time. Single elements or small groups of elements can be materialized in memory, serialized and subsequently thrown away. In another instance, portions of a described data structure can be materialized in memory to enable query operations. By deferring materialization and/or lazily materializing data, unnecessary work can be avoided including loading large amounts of data in memory. Not only is this more efficient than a conventional approach, but it can enable data processing where it might not otherwise be possible given a large data structure and small memory, for instance.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 5 illustrates a desired HTML view to be generated in accordance with a provided example.

DETAILED DESCRIPTION

Systems and methods are provided for processing data in a computer environment. A data representation can be utilized as a default means of processing data. For data serialization operations, the data representation can be executed iteratively or sequentially to retrieve data for output or transmission to a computer readable medium. In other instances, select portions of the data structure identified by the representation can be materialized to enable operation execution. The materialized portion can subsequently remain in memory or such space be reclaimed as function of an optimization analysis.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
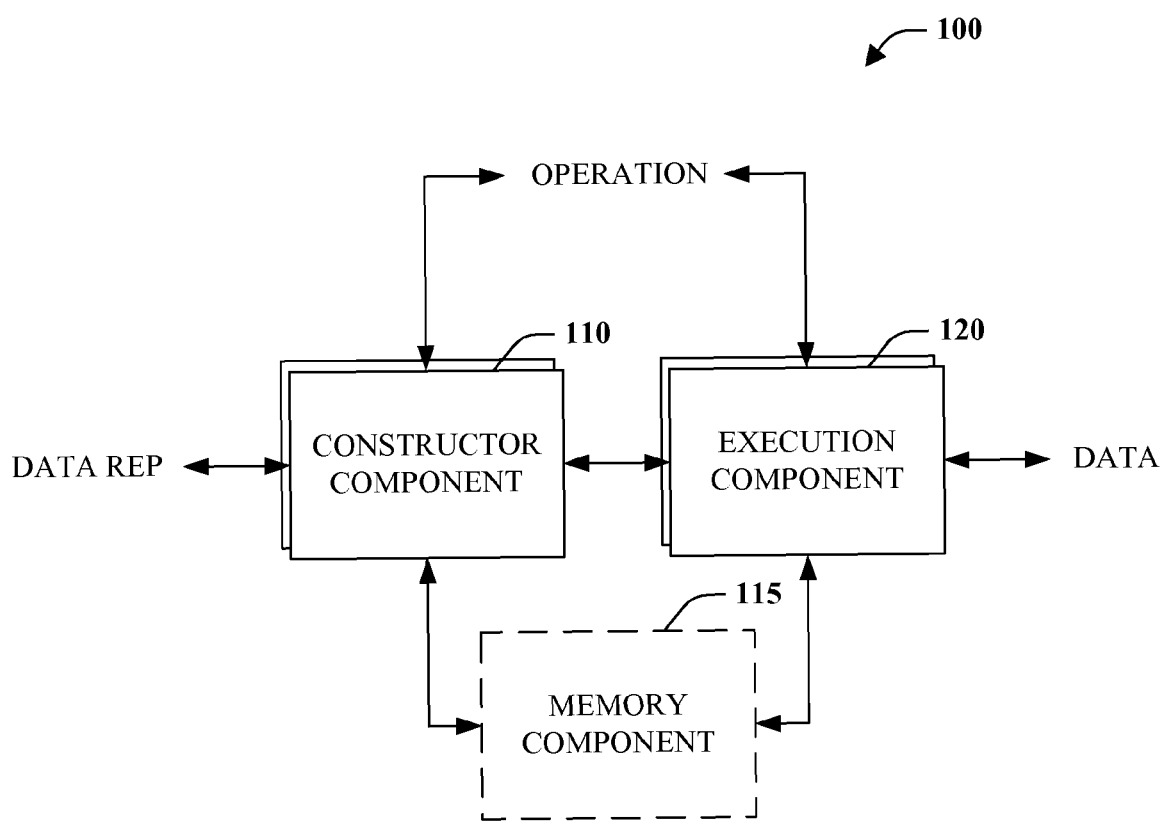
FIG. 1 is a block diagram of a data processing system in accordance with an aspect of the claimed subject matter.

Referring initially to FIG. 1, a data processing system 100 is depicted in accordance with an aspect of the claimed subject matter. The system 100 optimizes system resource utilization and/or processing of data. Prior to processing, conventional systems materialize or attempt to materialize an entire data structure into memory for processing. However, if the data structure is sufficiently large in size and/or the memory is rather small, the process is unaffordable. Further, even if the structure can fit in memory it may be wasteful to use an in-memory representation if there is no immediate use for an in-memory representation.

By way of example, suppose it is desired that a given in-memory object be traversed and an XML or HTML view extracted so that it can be stored in a file system or sent to a different application on the same or different computer. The XML view may potentially require so much memory that it would not be possible to materialize the view in memory or alternatively it would be wasteful to use an in-memory representation in the application that generates the view because this application has no immediate use for an in-memory representation. The system 100 affords a solution to this issue.

The system 100 includes a constructor component 110 that provides a mechanism for loading or populating memory component 115 (e.g., cache, RAM, flash . . . ) with data. The constructor component 110 need not perform such function at random. In fact, the constructor component can load the memory component 115 as a function of a data representation, operator and/or other input from execution component 120. Based on this information, the construction component can load the memory component 115 in a manner that preserves resources yet also enables efficient operation execution.

The data representation (also referred to as data description and descriptive data representation) identifies or describes data rather than being the data itself (although broadly it can be considered a type of data). In other words, the representation can identify computations of structures rather than the structures themselves. For instance, consider a set of numbers from one to one-hundred million. Each of the numbers from one to one-hundred million can be considered data described by the following declaration: Start from one and increment by one until one-hundred million. Accordingly, the data representation can correspond to a function, method, query or any other mechanism for identifying or describing data or portions thereof.

The operation is the particular type of data processing to be done. The operation can be received, retrieved or otherwise acquired or obtained by the construction component 110. For instance, the operation can be provided or retrieved externally or from the execution component 120. Alternatively, the operation can be inferred as a function of contextual information such as the data representation, previous runs and/or execution component 120 behavior. A number of operations are possible including saving or serializing, querying and transforming data to name but a few.

The execution component 120 executes an operation utilizing corresponding data loaded in the memory component 115 by the construction component 110. The execution component 120 can receive or retrieve the operation to execute externally. It can subsequently, or concurrently, provide the operation and/or operation identity to the construction component 110. Additionally or alternatively, the execution component 120 can notify the construction component to load the memory component 115. Execution of an operation can produce output as a function of the operation including a serialized data structure or query result, among other things.

Figure 2A:
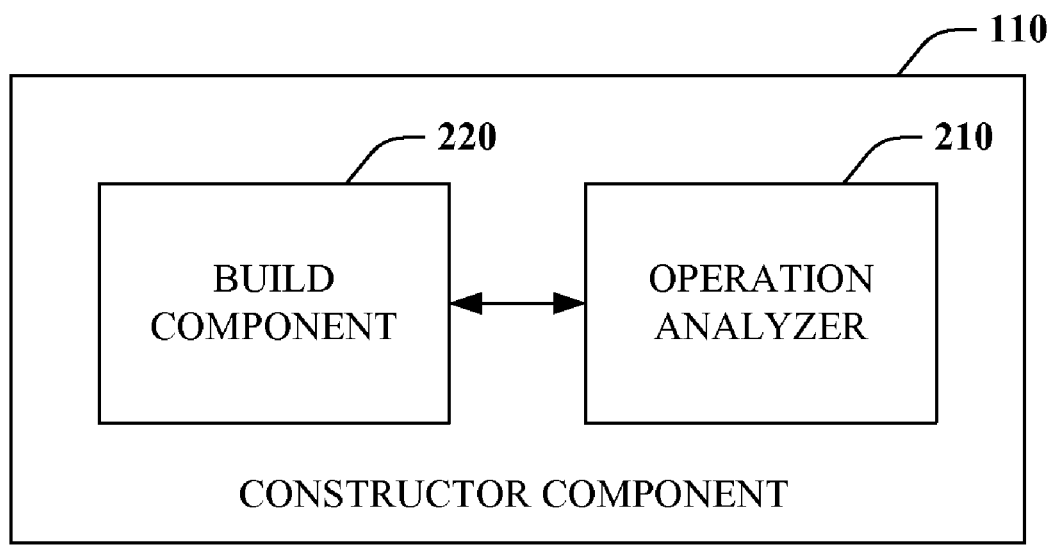
FIG. 2a is a block diagram of a representative construction component.
Figure 2B:
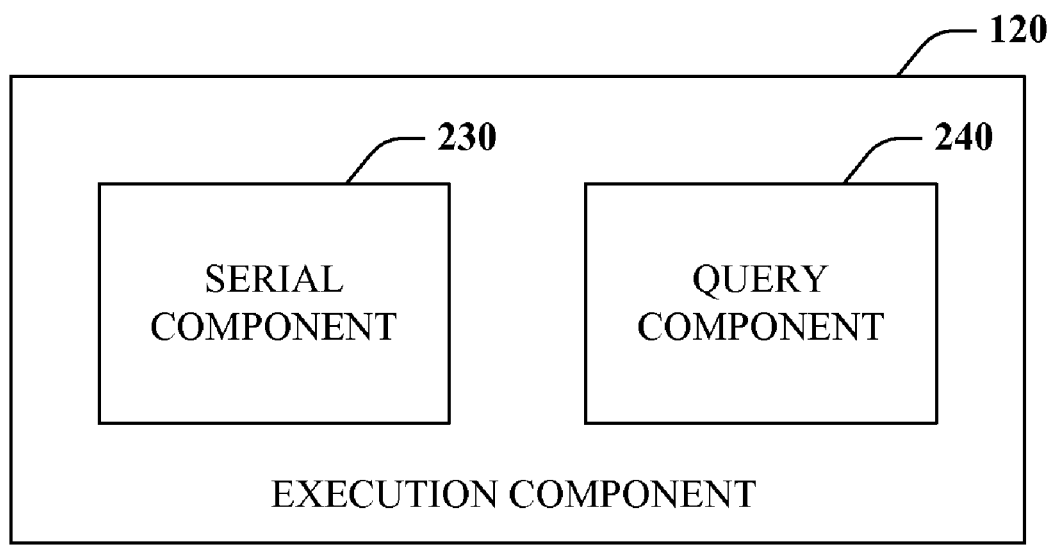
FIG. 2b is a block diagram of a representative execution component.

Functionality provided by the constructor component 110 and the execution component 120 can vary based on a particular operation. Referring briefly to FIGS. 2a-b, a representative constructor component 110 and execution component 120 are provided along with the below description to clarify some operational differences.

Turning first to FIG. 2a, the representative constructor component 110 includes an operation analyzer component 210 and a build component 220. The operation analyzer component 210 analyzes an operation and instructs the build component 210 concerning materialization of data to memory. As will be described in further detail below, a data representation or description can be loaded to memory by default or upon identification of a save or serialization operation. Alternatively, where a query or other operation is detected by the operation analyzer component 210, the build component 220 can build or materialize a data structure to memory. Moreover, where operation analyzer component 210 can determine that an operation is interested in solely a particular portion of data, then the build component 220 can materialize only that portion of data thereby preserving memory for other operations.

Referring to FIG. 2b, the representative execution component 120 is shown. The execution component 120 includes a serial component 230 and a query component 240. The serial component 230 provides a mechanism for computing or executing a data representation or description. Furthermore, the execution can be iterative such that data elements can be retrieved one by one. The query component 240 is a query processing mechanism to enable the execution component 120 to satisfy queries of materialized data structures in memory.

In general, the system 100 of FIG. 1 can operate in two distinct modes based on whether the operation corresponds to serialization or some other operation such as a query. Serialization is a unique case since it pertains to simply running though data and outputting each element. No relational element information needs to be maintained to respond to queries regarding element parents, children or the like. In one instance, a file can be opened, data written thereto and subsequently closed. In this situation, data can be generated in a serialization-oriented fashion without use of a full in-memory representation. A descriptive data representation need not be eagerly materialized to memory but rather deferred. More particularly, the representation can simply be loaded to memory and executed iteratively to serialize elements one at a time. This conserves system resources and optimizes performance, as a data structure does not first need to be materialized to memory including all relationships and other extraneous information.

Consider again the example of serialization of the numbers one to one-hundred million. Rather than eagerly attempting a lengthy process of materializing numbers one through one-hundred million in memory (if even possible), materialization can be deferred until a later time when such information is needed. Moreover, only a data representation or description need be loaded, not the entire set of numbers. The representation can indicate that the data is a collection of integers that starts at one and each subsequent number is incremented by one up to one-hundred million. This representation, here a function, can then be executed serially or iteratively such that the numbers are produced or materialized one by one and subsequently or concurrently serialized to a computer readable medium, communication stream or the like. Furthermore, as the data structure is iterated over, memory utilized by materialized elements can be thrown away or made available for reuse by subsequent materialized elements.

The other distinct mode can be to materialize data completely to memory. In this manner, all data element relationships can be captured. The materialized structure can subsequently be utilized to respond to queries and optionally update the data structure, among other things. However, this mode suffers from previously described problems including increased time required to materialize the complete structure and memory occupation (if enough space is available space to hold the structure).

In accordance with an aspect of the claimed subject matter, a hybrid can exist that merges the two distinct modes. Similar to the serialization mode, materialization of a data structure can be deferred. Stated differently, materialization can be executed lazily such that it is put off until as late as possible because it might mean that work need not be performed. This can accommodate a serialization operation, which is likely the most common scenario. Where a serialization operation is specified, for instance in various reporting applications, the data description can be loaded in memory and iterated through generating elements one at a time as previously described. Alternatively, if a query or other operator is to be executed than at least a portion of data structure can be materialized to memory. In accordance with one aspect, the materialization can be limited as function of an operation domain. For example, if it can be determined or inferred that the operation is concerned with a particular portion of a data structure, then only that portion should be materialized. In this manner, the operation can be executed while minimizing resource use, among other things.

Figure 3A:
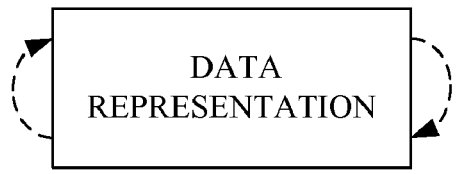
FIGS. 3a-c are exemplary graphical illustrations of data structure materialization utilizing different approaches.
Figure 3B:
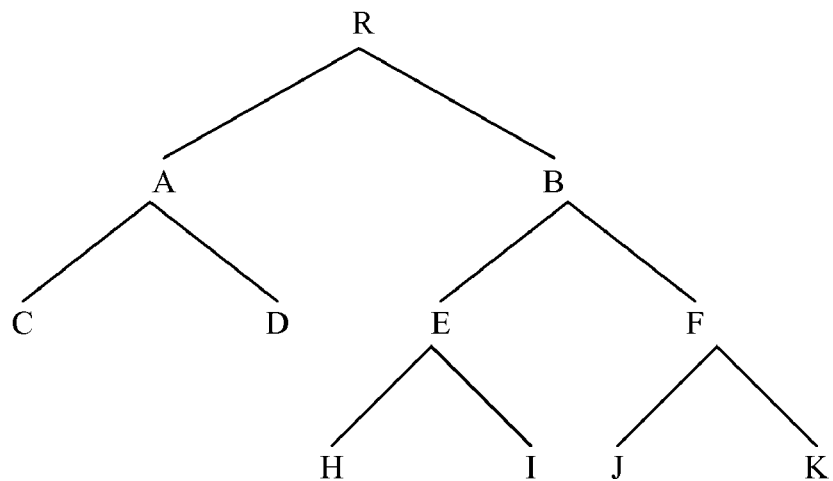

Turning to FIGS. 3a-b, exemplary graphical illustrations of data materialization are provided with respect to the distinct and hybrid modes to facilitate clarity and understanding. Here, the data structures correspond to trees. However, the claimed subject matter is not limited thereto.

FIG. 3a corresponds to a serialization operation. As shown, a data representation can be loaded in memory. This representation can subsequently be employed to materialize data elements one at a time, wherein as elements are serialized their memory space is made available for recapture and/or reuse.

FIG. 3b identifies the opposite in which an entire data tree is materialized to memory. Here, not only is the data materialized but relationship information is captured, represented graphically here as connecting lines between nodes. Accordingly, it can be determined that node "C" is a child of node "A" whose parent is root node "R."

Figure 3C:
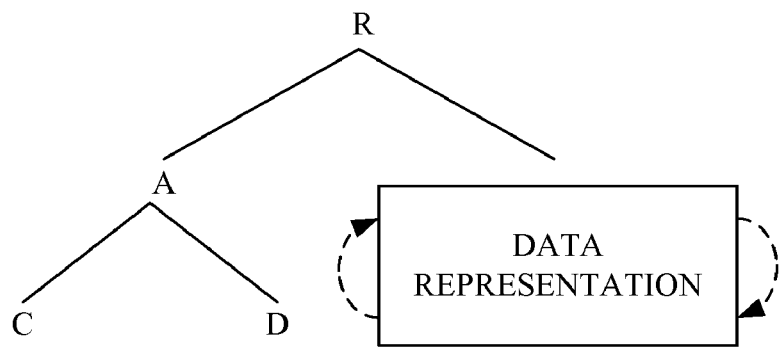

The hybrid on in this continuum is depicted in FIG. 3c. In this case, a portion of data structure is materialized while another is not. In this case, it may have been determined that an operation was only interested in sub-tree "A." Accordingly, that portion of the tree is materialized while the remainder of the tree is captured by the data representation. In other words, a portion of the tree can be inflated. This is simply one example. The tree can include various combinations of materialized and non-materialized portions as a function of operations executed thereon.

Returning to FIG. 1, it is to be appreciated that data processing system 100 can be implemented or embodied in a number of ways. For instance, the constructor component 110 and execution component 120 form part of an application programming interface (API), a program language implementation and/or a compiler, amongst other things. Furthermore, the functionality can be performed in aggregate or separately. For example, a single API can developed and employed that automatically materializes an entire structure, performs deferred materialization or operates as a hybrid based on a variety of factors including operations to be performed. Alternatively, there can be multiple APIs that can be utilized by programmers to control whether a data structure is eagerly materialized (e.g., "XElement"), deferred (e.g., "XDeferredElement") or a hybrid of the two (e.g., "XHybridElement").

Further yet, it is to be appreciated that low level unparsing APIs can be employed to materialize data structures in a serialization oriented fashion. However, use of these low level APIs requires special programming skills, and it is cumbersome as well as error prone. In accordance with an aspect of the claimed subject matter, data can be materialized in a more compositional than imperative way. More specifically, a declarative method is supported that can employ functional programming-like idioms such as expression-oriented data construction and compositional queries, as well as lazy execution where necessary.

Figure 4:
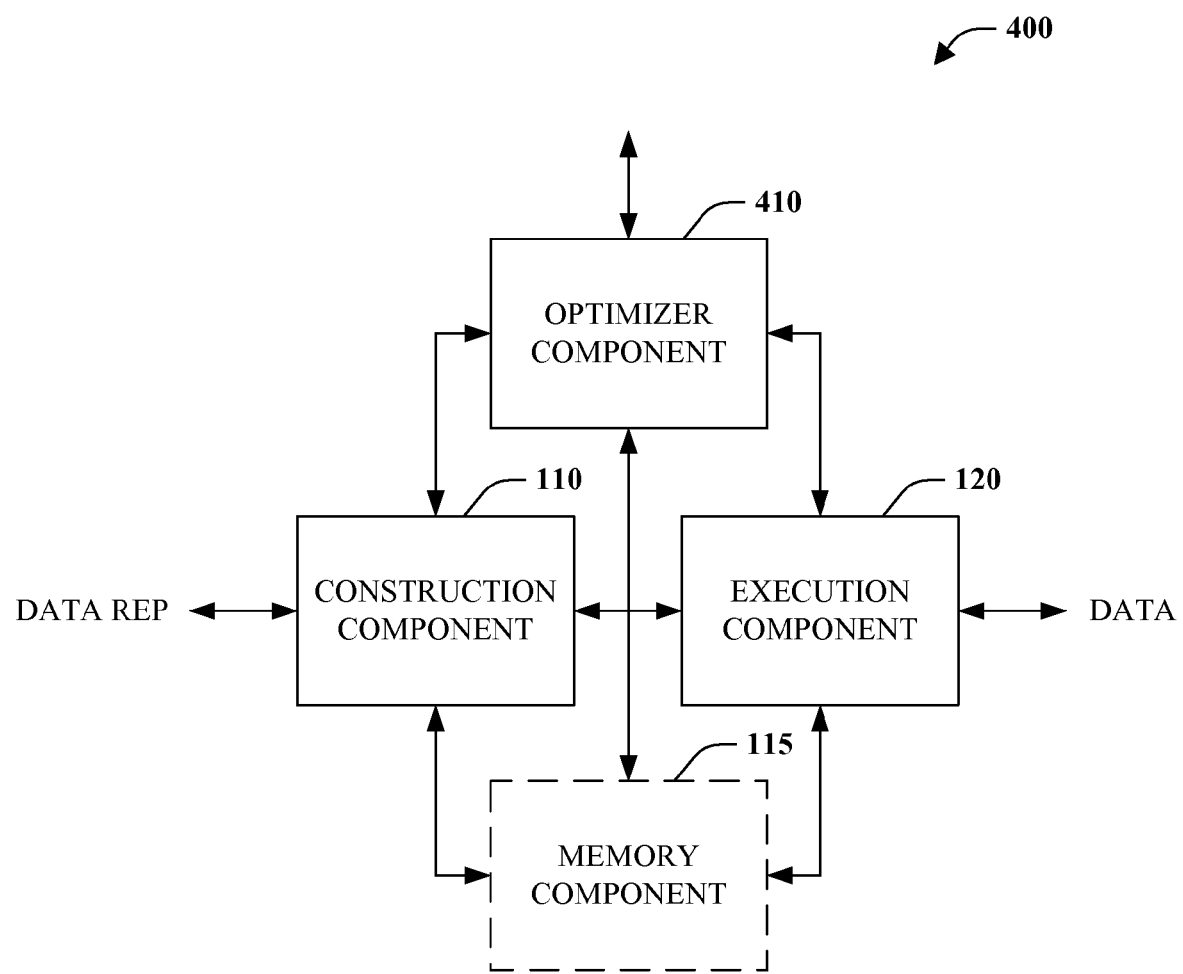
FIG. 4 is a block diagram of an optimized data processing system in accordance with an aspect of the claimed subject matter.

Referring to FIG. 4, an optimized data processing system 400 is illustrated in accordance with an aspect of the claimed subject matter. Similar to system 100 of FIG. 1, the system 400 includes the constructor component 110, execution component 120 and memory component 115, as previously described. In brief, the constructor component 110 can load the memory component 115 with appropriate data for execution of an operation by execution component 120. The system 400 also includes an optimization component 410 to optimize data processing and/or system resource utilization. As previously noted, a spectrum or continuum can exist between eager and deferred materialization. The optimization component 410 can identify and seek to obtain an optimal position on such a continuum with respect to processing and resource use.

For example, consider a hybrid scenario in which a portion of a data structure is materialized to memory to facilitate execution of an operation. A decision can be made concerning whether or not the materialized structure should remain in memory or be released for reuse. While a default can exist, a default's static nature can result in sub-optimal performance. The optimization component 410 can determine and effectuate an optimal solution utilizing context information. For example, if memory is scarce or demand is high the optimization component 410 can release the memory for garbage collection and reuse. Alternatively, a decision can be made to keep a materialized data structure where it can be determined or inferred that it is likely that future operations will need the data structure. In general, the optimization component 410 make a decision based on cost of materialization and/or maintenance in memory and value associated with alternate use.

For purposes of clarity and understanding, what follows is an exemplary use case for serialization. This provides more concrete detail pertaining to how aspects of the disclosure can be employed and/or embodied. It is to be noted that the following is merely exemplary and is not intended to limit the scope of the claimed subject matter.

Consider a scenario in which an HTML (Hyper Text Markup Language) representation of a given object graph is extracted such that fields of each object are listed and all sub-objects are recursively turned into HTML. A web browser should be able to render the HTML in real-time, namely as the .html file is generated sequentially.

Here is an object model for abstract syntax trees of a simple programming language.

```
public abstract class Expression { }
public class Var : Expression {
   public string Id;
}
public class Const : Expression {
   public int Lit;
}
public class Add : Expression {
   public Expression Left, Right;
}
public class Mult : Expression {
   public Expression Left, Right;
}
public abstract class Statement { }
public class Assign : Statement {
   public string Lhs;
   public Expression Rhs;
}
public class AndThen : Statement {
   public Statement Fst, Snd;
}
public class IfThenElse : Statement {
   public Expression Cond;
   public Statement Then, Else;
}
public class While : Statement {
   public Expression Cond;
   public Statement Body;
}
```

The following is a specific program in the language described by the above object model:

```
var prog =
   new AndThen {
      Fst = new Assign { Lhs = "n", Rhs = new Const { Lit = 42 } },
      Snd = new AndThen {
         Fst = new Assign { Lhs = "factorial", Rhs = new Const
            { Lit = 1 } },
         Snd = new While {
            Cond = new Var { Id = "n" },
            Body = new AndThen {
               Fst = new Assign {
                  Lhs = "factorial",
                  Rhs = new Mult {
                     Left = new Var { Id = "factorial" },
                     Right = new Var { Id = "n" } } },
               Snd = new Assign {
                  Lhs = "n",
                  Rhs = new Add {
                     Left = new Var { Id = "n" },
                     Right = new Const { Lit = -1 } } } } } } };
```

This is actually a while loop for computing the factorial of 42. In a more familiar syntax, this program may be written like this:

```
n = 42;
factorial = 1;
while (n) {
   factorial = factorial * n;
   n = n - 1;
}
```

Assume an HTML view is desired as shown in FIG. 5. For brevity, only rendering of the "While" loop is shown. The underlying HTML may look as follows:

```
<html>
   <title>Object Browser</title>
   <body>
      AndThen: <dl>
         <dt>
            <b>Fst</b>
         </dt>
         <dd>
            Assign: <dl>
               <dt>
                  <b>Lhs</b>
               </dt>
               <dd>string: n</dd>
               <dt>
                  <b>Rhs</b>
               </dt>
               <dd>
                  Const: <dl>
                     <dt>
                        <b>List</b>
                     </dt>
                     <dd>int: 42</dd>
                  </dl>
               </dd>
            </dl>
         </dd>
         <dt>
            <b>Snd</b>
         </dt>
         <dd>
            AndThen: <dl>
               <dt>
                  <b>Fst</b>
               </dt>
               <dd>
                  Assign: <dl>
                     <dt>
                        <b>Lhs</b>
                     </dt>
                     <dd>string: factorial</dd>
                     <dt>
                        <b>Rhs</b>
                     </dt>
                     <dd>
                        Const: <dl>
                           <dt>
                              <b>Lit</b>
                           </dt>
                           <dd>int: 1</dd>
                        </dl>
                     </dd>
                  </dl>
               </dd>
               <dt>
                  <b>Snd</b>
               </dt>
               <dd>
                  While: <dl>
                  ...
```

Using C# and a designated type "XDeferredElement" for serialization-oriented XML trees, declarative code can be devised for the creation of the HTML view. A portion of the code is shown below. A more complete version of the code is provided in the attached Appendix.

```
// Create HTML view for a given object
//
static XDeferredElement ObjectToHtml(object obj)
{
   return
      new XDeferredElement("html",
         new XDeferredElement("title", "Object Browser"),
         new XDeferredElement("body", ObjectToP(obj)));
}
```

```
// Create a HTML paragraph for an object
//
static object ObjectToP(object obj)
{
  return
    new[ ] {
      TypeToString(obj.GetType( )) + ":" + " ",
      (obj == null || obj is ValueType || obj is string) ?
        (object)ValueToString(obj)
        : (object)MembersToDl(obj)
    };
}
// Map fields to an HTML description list "<DL>"
//
static XDeferredElement MembersToDl(object obj)
{
  return
    new XDeferredElement("dl",
      from field in obj.GetType( ).GetFields( )
      select
        new XDeferredElement[ ] {
          new XDeferredElement("dt",new
            XDeferredElement("b",field.Name)),
          new XDeferredElement("dd",ObjectToP(field.GetValue(obj)))});
}
```

That is, for each given object a check is made to determine whether it is non-decomposable, in which case, a simple (and hence omitted) function "ValueToString" can be applied. Otherwise, the code can recurse into the object at hand using a function "MembersToDl" which maps over the fields of a compound objects, and rending the fields as an HTML description list—using again "ObjectToP" for the value of each field.

The example is written in functional programming style such that the result (e.g., the HTML view) is constructed with the expression-oriented idiom of functional construction "XDeferredElement("dl", . . . )"; recursion is used to descend into the object graph; list-processing idioms handle the list of fields (cf from field in . . . select . . . ).

One characteristic of the encoding is that the query for the recursive treatment of sub-objects is stored, as is, by its parenting "XDeferredElement" instance. The query is executed only when the "XDeferredElement" instance is serialized later. The XML tree (HTML tree) is not materialized in memory.

Furthermore, serialization semantics (as opposed to an in-memory semantics) can be achieved without sacrificing idiomatic convenience of an in-memory API. That is, for comparison, consider the following variation on the fragment above. It uses an in-memory XML tree type, "XElement," and the replacement of "XDeferredElement" by "XElement" is indeed the only required change.

```
// Create HTML view for a given object
//
static XElement ObjectToHtml(object obj)
{
  return
    new XElement("html",
      new XElement("title", "Object Browser"),
      new XElement("body", ObjectToP(obj)));
}
// Create a HTML paragraph for an object
//
static object ObjectToP(object obj)
{
  ... no changes ...
}
// Map fields to an HTML description list "<DL>"
//
static XElement MembersToDl(object obj)
{
  return
    new XElement("dl",
      from field in obj.GetType( ).GetFields( )
      select
        new XElement[ ] {
          new XElement("dt",new XElement("b",field.Name)),
          new XElement("dd",ObjectToP(field.GetValue(obj)))});
}
```

Without loss of generality, an API for in-memory XML trees, can leverage an object type "XElement" with the following capabilities:

Tree construction

Load a serialized tree into memory

Save an instance as a serialized tree

XML Queries (such as XPath-like axes)

Imperative updates of the mutable XML trees

Deferred query execution for serialization-oriented trees concerns these capabilities:

Tree construction

Save an instance as a serialized tree

The internal state and external API of an object type for serialization-oriented trees can be assumed to be the following:

```
public class XDeferredElement
{
  //
  // Representation of trees
  // In general, content is of a collection type!
  //
  private XName name;
  private object content;
  //
  // Construct a tree instance.
  // Any argument, be it a query, is stored, as is.
  //
  public XDeferredElement(XName name, params object[ ] content);
  //
  // These tree instances can be saved.
  //
  public void Save(string fileName);
}
```

When a tree instance is saved, essentially the name and the content are serialized in the normal sense of XML unparsing. That is, we open the element, write its content (including attributes, sub-trees), and close the element.

As an illustration, the following case discrimination on content of "XDeferredElement" instances handles monolithic attributes ("XAttribute"), in-memory nodes ("XNode"), interim text ("string"), serialization-oriented trees ("XDeferredElement"), and embedded queries ("IEnumerable"). One can assume that the shown "Serialize" method is declared by an auxiliary serializer object that is created and directly invoked from the Save method above. Low-level code for serializing nodes and attributes and strings is elided, while the important insight is bolded. Embedded queries are executed such that each element of the resulting list is serialized immediately and individually without keeping any handle on an element once its serialization has completed.

```
void Serialize(object content)
{
    if (content == null) return;
    XNode n = content as XNode;
    if (n != null) {
        SerializeNode(n);
        return;
    }
    string s = content as string;
    if (s != null) {
        SerializeString(s);
        return;
    }
    XAttribute a = content as XAttribute;
    if (a != null) {
        SerializeAttribute(a);
        return;
    }
    XDeferredElement x = content as XDeferredElement;
    if (x != null) {
        SerializeDeferredElement(x);
        return;
    }
    IEnumerable e = content as IEnumerable;
    if (e != null) {
        foreach (object obj in e) Serialize(obj);
        return;
    }
}
```

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, optimization component 410 can utilize such mechanism to optimize data processing and resource utilization.

Figure 6:
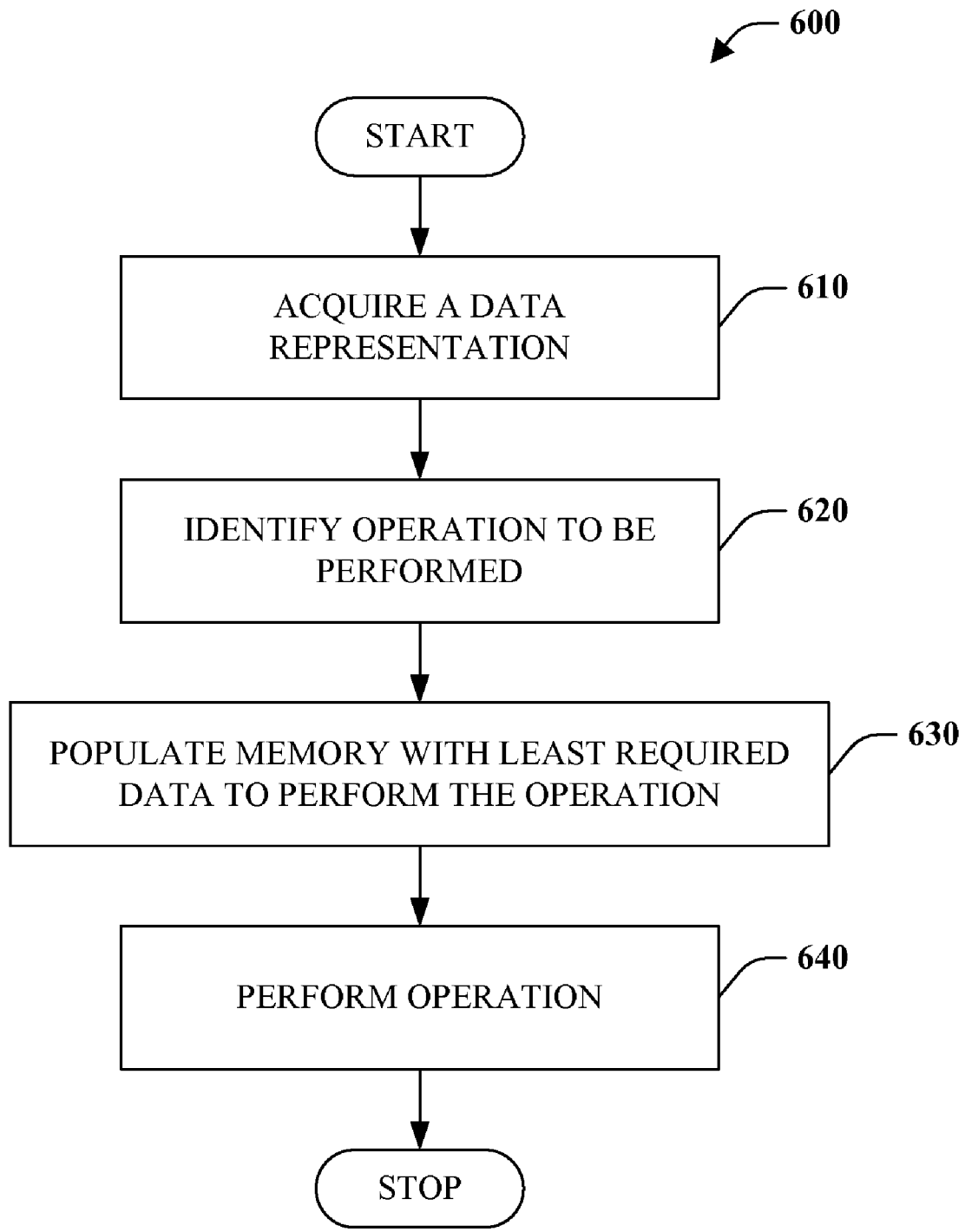
FIG. 6 is a flow chart diagram of a method of data processing in accordance with an aspect of the claimed subject matter
Figure 7:
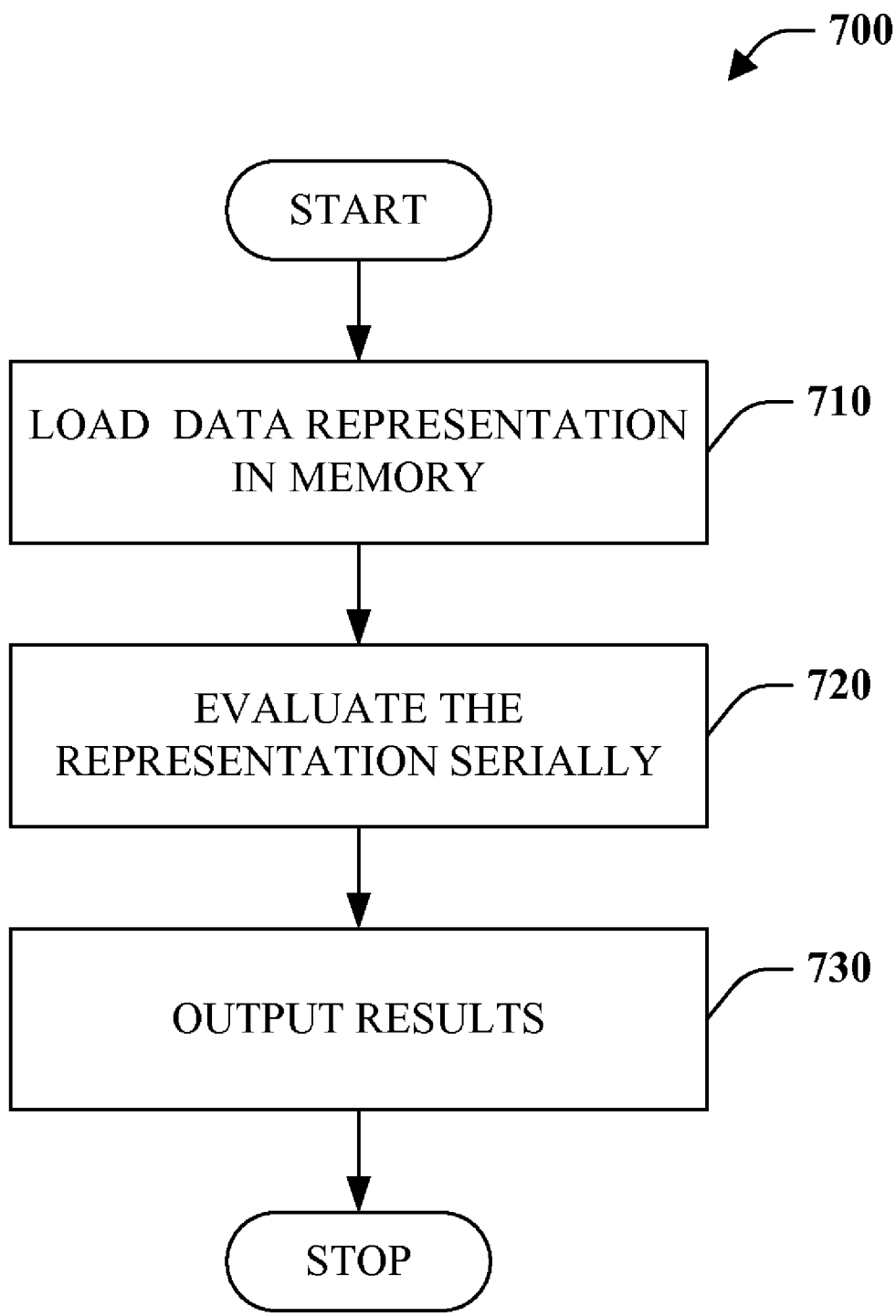
FIG. 7 is a flow chart diagram of a method of serializing data in accordance with an aspect of the claimed subject matter.
Figure 8:
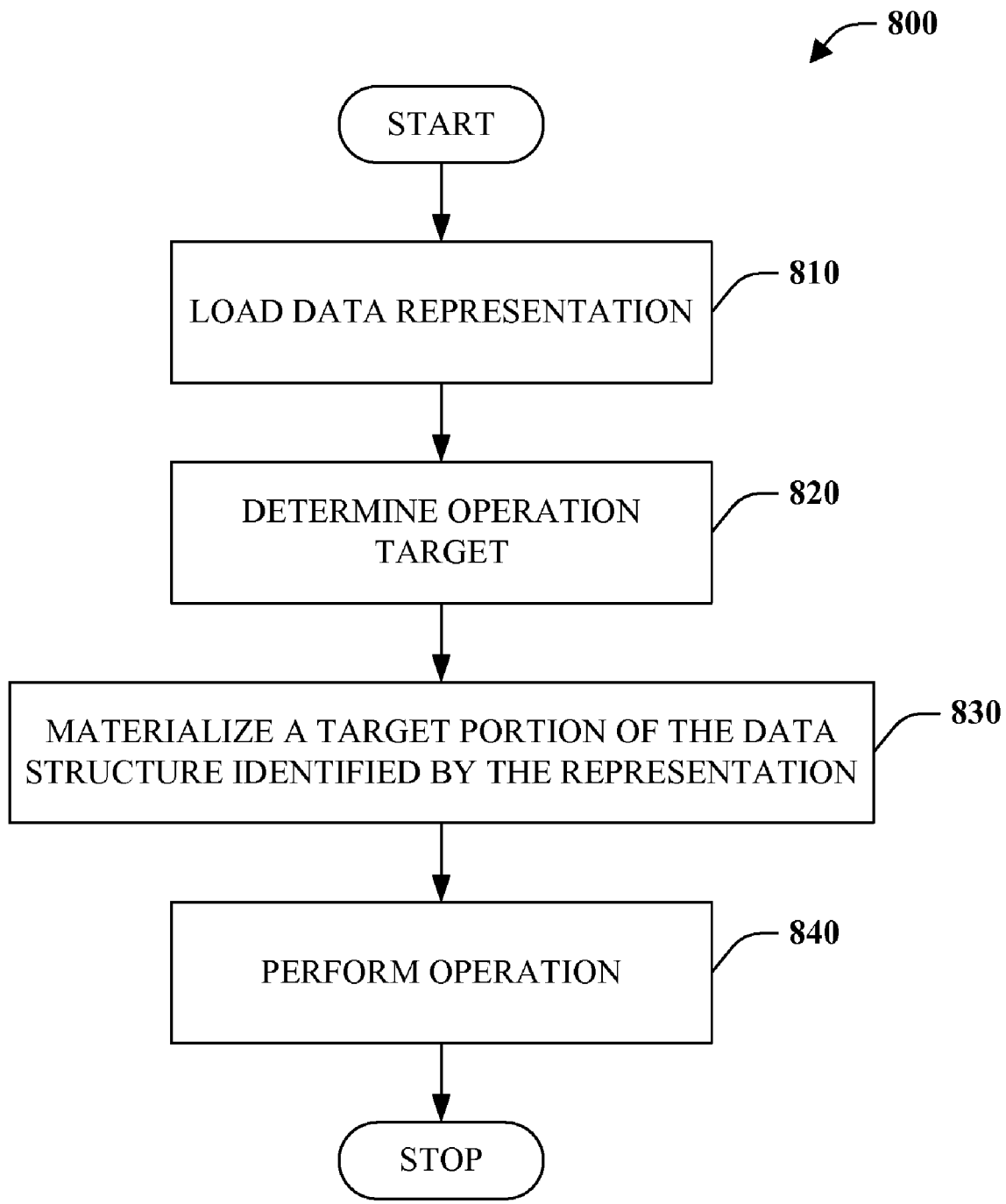
FIG. 8 is a flow chart diagram of a hybrid method of data processing in accordance with an aspect of the claimed subject matter.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 6, a method of data processing 600 is depicted in accordance with an aspect of the claimed subject matter. At reference numeral 610, a data representation describing data is acquired. For example, this can correspond to a method, function and/or query, among other things. At numeral 620, an operation to be performed is identified such as serialization, query, update, etc. Memory is populated with the least amount of data necessary to perform the identified operation at 630. In this manner, resources can be utilized more intelligently rather than simply attempting to load an entire data structure in memory where it is not necessary. At numeral 640, the operation is executed utilizing the data provided in memory and any output provided.

Turning to FIG. 7, a method of serializing data 700 is illustrated in accordance with an aspect of the claimed subject matter. At reference numeral 710, a data representation is loaded in memory. This representation can describe data to be serialized declaratively and/or imperatively. At numeral 720, the data representation is evaluated iteratively or serially. In other words, data can be materialized element by element as a list is iterated. The materialized data can subsequently be output at reference numeral 730. In sum, rather than eagerly materializing a data structure to memory, materialization is deferred until serialization. Further, the entire structure is not kept in memory at the same time. Instead, data elements are materialized and serialized iteratively and thrown away after they have been processed. This makes efficient use of memory.

FIG. 8 is a flow chart diagram of a hybrid method of data processing 800 in accordance with an aspect of the claimed subject matter. At reference numeral 810, a data representation describing a data structure is loaded in memory rather than a materialization of the data structure itself An operator target is identified at numeral 820. In other words, a pertinent portion of a data structure over which operations are performed is determined or otherwise identified. For example, an operator may seek to query a particular portion of a tree. At numeral 830, the identified portion of data described by the representation is materialized. At reference number 840, an operation is performed utilizing the materialized data structure.

The hybrid method of data processing 800 provides for deferred data processing to facilitate efficient memory utilization, among other things. Rather then always materializing an entire data structure to memory, the method 800 can load a description of the data, which almost always will be significantly smaller that the materialized structure itself. In this way, it is similar to the method for serializing data. This is a good starting point since serialization is more likely to be performed than any other operation. Upon analysis of an operation to be performed, data structures can be materialized. However, only a pertinent portion of the structure needs to be constructed. In some cases, this can correspond to the entire data structure, but in many other cases this will be a segment thereof enabling resources to be used more efficiently.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
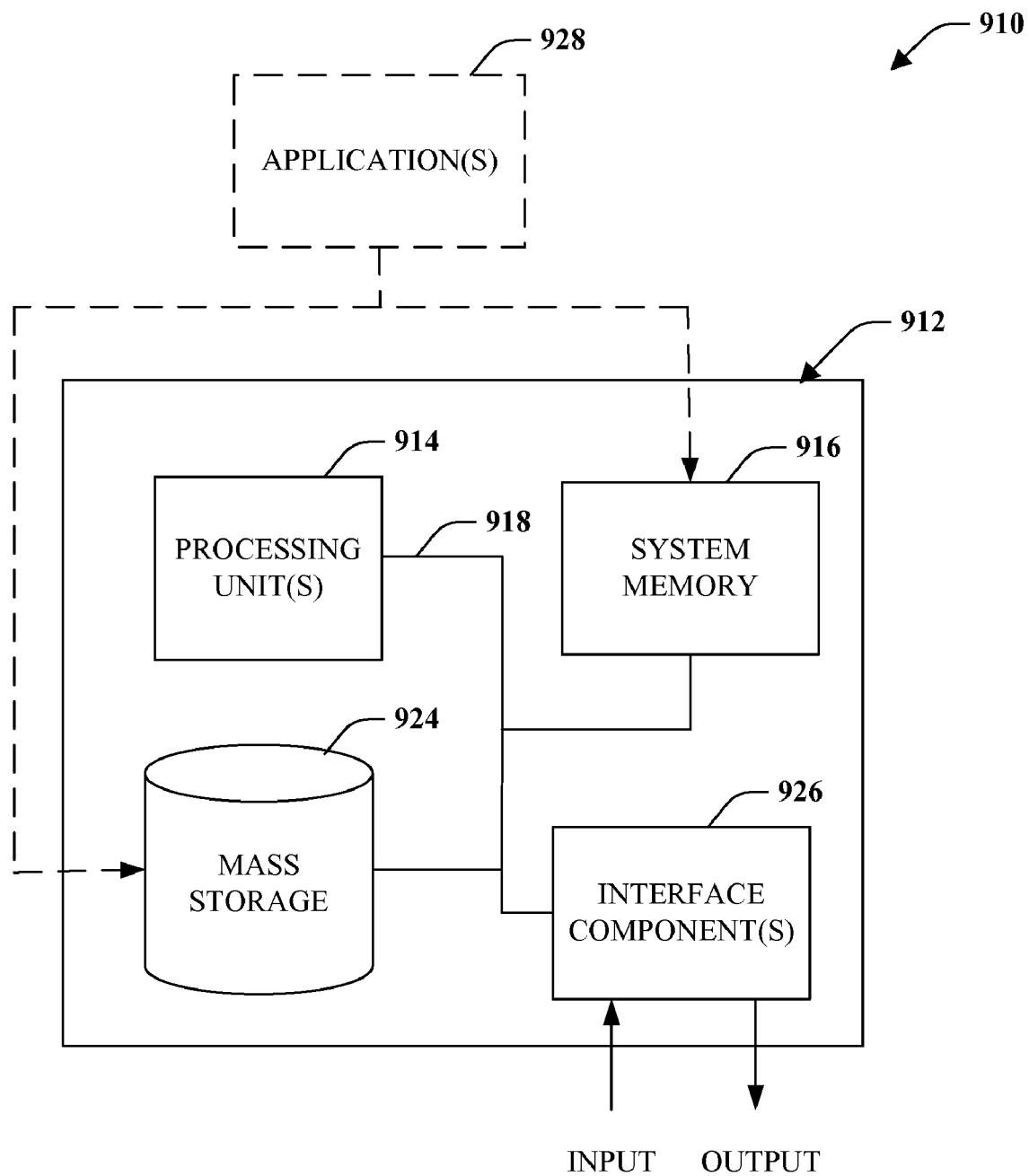
FIG. 9 is a schematic block diagram illustrating a suitable operating environment for aspects of the subject disclosure.
Figure 10:
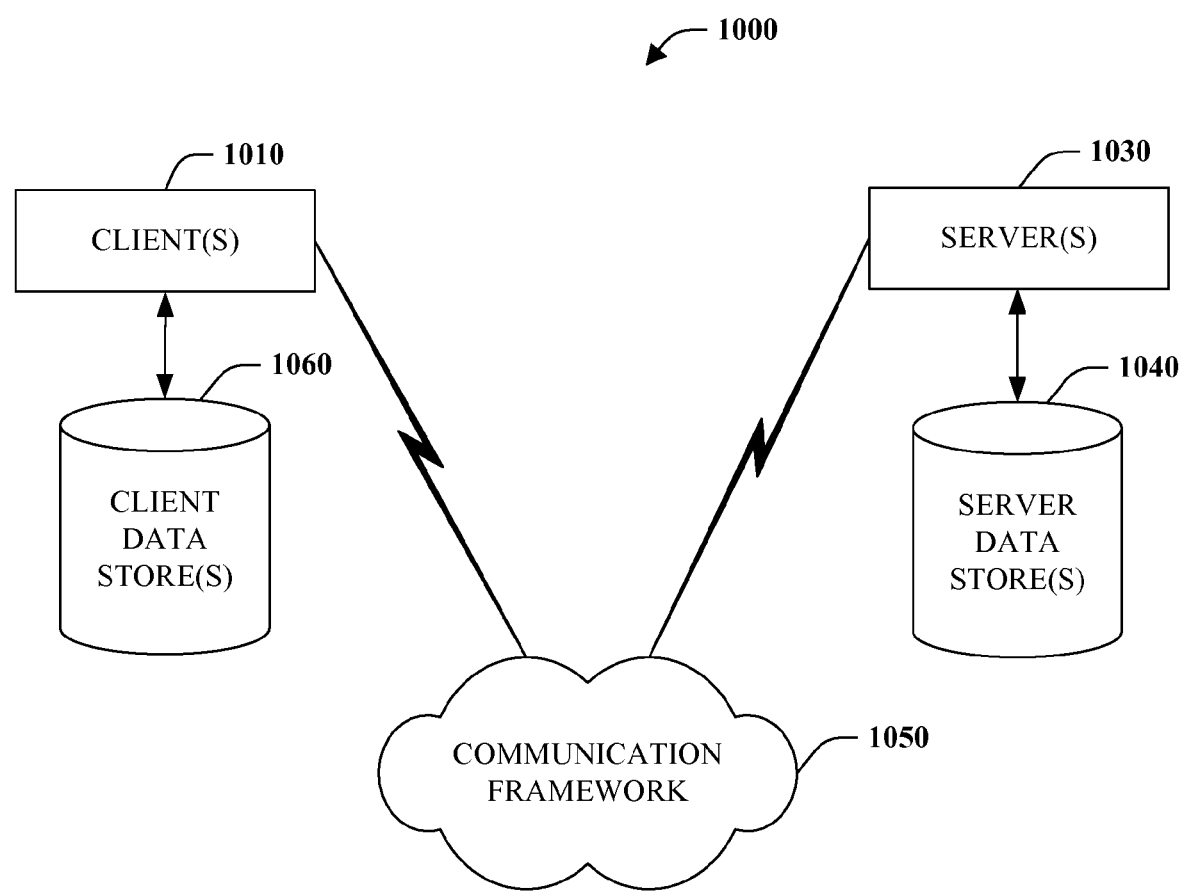
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 910. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030. For example, a client 1010 can acquire a data structure from a server 1030 over the communication framework 1050 for processing (e.g., serialization, query . . . ). Additionally or alternatively, data can be serialized over the communication framework 1050 to either a client 1010 and/or a server 1030 for further processing or saving to a local store 1060 and 1040, respectively.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

APPENDIX

```
// Create HTML view for a given object
//
static XDeferredElement ObjectToHtml(object obj)
{
    return
        new XDeferredElement("html",
            new XDeferredElement("title", "Object Browser"),
            new XDeferredElement("body", ObjectToP(obj)));
}
//
// Create a HTML paragraph for an object
//
static object ObjectToP(object obj)
{
    return
        new[ ] {
            TypeToString(obj.GetType( )) + ":" + " ",
            (obj == null || obj is ValueType || obj is string) ?
                (object)ValueToString(obj)
                : (object)MembersToDl(obj)
        };
}
//
// Map type name to string
//
static string TypeToString(Type t) {
    if (t == typeof(System.String))
```

APPENDIX-continued

```
        return "string";
    else
    if (t == typeof(System.Int32))
        return "int";
    //
    // Likewise for other System types
    //
    else
        return t.ToString( );
}
//
// Map non-decomposable value/object to string
//
static string ValueToString(object obj) {
    if (obj == null)
        return "null";
    else
    if (obj is DateTime)
        return ((DateTime)obj).ToShortDateString( );
    //
    // Potentially other special cases
    //
    else
        if (obj is ValueType || obj is string)
            return obj.ToString( );
    else
        throw new InvalidProgramException( );
}
//
// Map fields to an HTML description list "<DL>"
//
static XDeferredElement MembersToDl(object obj)
{
    return
        new XDeferredElement("dl",
            from field in obj.GetType( ).GetFields( )
            select
                new XDeferredElement[ ] {
                    new XDeferredElement("dt",
                        new XDeferredElement("b",
                        field.Name)),
                    new XDeferredElement("dd",
                        ObjectToP(field.GetValue(obj)))});
}
```

What is claimed is:

1. A structured data processing system, comprising:
a processor;
system memory;
an inferring component that infers an operation from a plurality of available operations to be performed on a data structure from contextual information about the data structure, wherein the plurality of operations use different portions of data during execution of the data depending on which operation is performed, and wherein the contextual information includes one or more previous runs and execution behavior;
an analyzer component that analyzes the inferred operation to determine which portion of data the inferred operation is to use and is to be materialized into memory;
a constructor component that constructs a data representation that is separate from and external to the data that is to be materialized, according to the analyzer component's determination of which data is to be materialized into memory, wherein the data representation describes computations of the data structures that are to be materialized rather than comprising the structures in their original format or in another format, such that a declarable set of data structures is identifiable and accessible using the data representation;
an evaluation component that evaluates the declarable set of data structures represented by the data representation in accordance with the operation to produce a result; and a materializing component that materializes the data structures based on the data representation that describes the data structures, wherein the materializing component identifies an optimal amount of data to materialize based on current processing resource use for the system such that determined current need for the data is balanced against processing resource use, deferring materializing of an optimal portion of the data structures into memory until after the inferred operation is determined and the data portion is indicated as being needed when balanced with the current processing resource use.

2. The system of claim 1, the constructor component materializes a data structure described by the representation in memory.

3. The system of claim 1, the constructor component saves the data representation to memory.

4. The system of claim 3, the evaluation component performs a serialization operation.

5. The system of claim 4, the evaluation component executes the data representation iteratively and outputs results as they are determined.

6. The system of claim 5, memory space is immediately made available for recapture after each result is output.

7. The system of claim 3, the constructor component materializes a portion of the structure described by the representation in memory to enable further processing.

8. The system of claim 7, the constructor component constructs only the minimum structured necessary to effect the further processing.

9. The system of claim 7, further comprising an optimization component that determines whether or not the constructed portion should remain in memory after an evaluation as a function of memory space and likelihood of reuse.

10. The system of claim 1, the components are part of an application programming interface.

11. The system of claim 1, the components are part of a program language implementation.

12. A method of processing data, comprising:
inferring an operation from a plurality of available operations to be performed on a data structure from contextual information about the data structure, wherein the plurality of operations use different portions of data during execution of the data depending on which operation is performed, and wherein the contextual information includes one or more previous runs and execution behavior;
analyzing the inferred operation to determine which portion of data the inferred operation is to use and is to be materialized into memory;
constructing a data representation that is separate from and external to the data that is to be materialized, according to the analyzer component's determination of which data is to be materialized into memory, wherein the data representation describes computations of the data structures that are to be materialized rather than comprising the structures in their original format or in another format, such that a declarable set of data structures is identifiable and accessible using the data representation;
materializing in memory the data structures based on the data representation that describes the data structures, wherein the materializing component identifies an optimal amount of data to materialize based on current processing resource use for the system such that determined current need for the data is balanced against processing resource use, deferring materializing of an optimal portion of the data structures into memory until after the inferred operation is determined and the data portion is indicated as being needed when balanced with the current processing resource use;
producing data utilizing the data representation; and
performing the operation using the produced data.

13. The method of claim 12, further comprising evaluating the description iteratively to acquire the data.

14. The method of claim 13, further comprising serializing data to a computer readable medium or communication stream.

15. The method of claim 12, further comprising:
identifying a data producing operation; and
materializing a portion of structured data identified by the description in memory as a function of the operation.

16. The method of claim 15, identifying a query operation over a segment of structured data.

17. The method of claim 15, further comprising removing the materialized portion from memory subsequent to data production.

18. The method of claim 15, materializing a portion of structured data comprises determining and saving one or more relationships between data elements as a function of the operation.

19. The method of claim 12, comprising producing one of XML data, a database table, a comma separated file, a stream, music and video.

20. A structured data processing system, comprising:
processing means;
memory means;
means for inferring an operation from a plurality of available operations to be performed on a data structure from contextual information about the data structure, wherein the plurality of operations use different portions of data during execution of the data depending on which operation is performed, and wherein the contextual information includes one or more previous runs and execution behavior;
means for analyzing the inferred operation to determine which portion of data the inferred operation is to use and is to be materialized into memory;
means for constructing a descriptive data representation that is separate from and external to the data that is to be materialized, according to the analyzer component's determination of which data is to be materialized into memory, wherein the data representation describes computations of the data structures that are to be materialized rather than comprising the structures in their original format or in another format, such that a declarable set of data structures is identifiable and accessible using the data representation;
means for materializing in memory the data structures based on the data representation that describes the data structures, wherein the materializing component identifies an optimal amount of data to materialize based on current processing resource use for the system such that determined current need for the data is balanced against processing resource use, deferring materializing of an optimal portion of the data structures into memory until after the inferred operation is determined and the data portion is indicated as being needed when balanced with the current processing resource use; and
means for executing the descriptive data representation iteratively to serialize structured data described by the representation without loading an entire data structure in memory.

* * * * *